(12) United States Patent
Fujimoto et al.

(10) Patent No.: US 7,365,944 B2
(45) Date of Patent: Apr. 29, 2008

(54) MAGNETIC HEAD SUSPENSION WITH REDUCED MASS LOAD BEAM PORTION

(75) Inventors: Yasuo Fujimoto, Kyoto (JP); Satoru Takasugi, Kyoto (JP)

(73) Assignee: Suncall Corporation, Kyoto-shi, Kyoto-fu (JP)

( * ) Notice: Subject to any disclaimer, the term of this patent is extended or adjusted under 35 U.S.C. 154(b) by 413 days.

(21) Appl. No.: 11/073,709

(22) Filed: Mar. 8, 2005

(65) Prior Publication Data

US 2005/0201014 A1 Sep. 15, 2005

(30) Foreign Application Priority Data

Mar. 10, 2004 (JP) ............... 2004-067438

(51) Int. Cl.
G11B 5/48 (2006.01)
(52) U.S. Cl. ............... 360/244.2; 360/244.8; 360/244.9; 360/245
(58) Field of Classification Search ........... 360/244.9, 360/244.2, 244.8, 245.2, 245
See application file for complete search history.

(56) References Cited

U.S. PATENT DOCUMENTS

| | | | |
|---|---|---|---|
| 3,931,641 A * | 1/1976 | Watrous | 360/244.9 |
| 5,027,240 A * | 6/1991 | Zarouri et al. | 360/244.2 |
| 5,844,752 A | 12/1998 | Bozorgi et al. | |
| 5,850,319 A * | 12/1998 | Tangren | 360/244.9 |
| 6,043,956 A | 3/2000 | Hanya et al. | |
| 6,141,187 A | 10/2000 | Wong et al. | |
| 6,219,203 B1 * | 4/2001 | Arya et al. | 360/244.2 |
| 6,271,996 B1 | 8/2001 | Houk et al. | |
| 6,307,719 B1 | 10/2001 | Mallary | |
| 6,731,465 B2 | 5/2004 | Crane et al. | |
| 6,735,050 B2 | 5/2004 | Takagi et al. | |
| 2001/0008475 A1 | 7/2001 | Takagi et al. | |
| 2002/0051319 A1 * | 5/2002 | Takagi et al. | 360/244.9 |
| 2002/0109943 A1 * | 8/2002 | Crane et al. | 360/244.3 |
| 2004/0095681 A1 | 5/2004 | Takasugi et al. | |
| 2004/0145829 A1 | 7/2004 | Fujimoto | |
| 2004/0150918 A1 | 8/2004 | Murakami et al. | |

(Continued)

FOREIGN PATENT DOCUMENTS

JP 62-279570 12/1987

(Continued)

Primary Examiner—Craig A. Renner
(74) Attorney, Agent, or Firm—Sterne, Kessler, Goldstein & Fox

(57) ABSTRACT

A magnetic head suspension includes a flexure portion, a load bend portion, a load beam portion, and a base portion. The load beam portion includes: a base end area continuously connected with the load bend portion; an intermediate area extending from the base end area toward a tip end side, and a tip end area extending from the intermediate area toward the tip end side to reach the magnetic head mount area. The base end area has first side edges tilted so as to gradually approach a central longitudinal axis line of the magnetic head suspension as the first side edges go toward the tip end side. The intermediate area has second side edges continuously connected with the first side edges and configured to be substantially parallel with the central longitudinal axis line or to be tilted to gradually approach the central longitudinal axis line as the second side edges go toward the tip end side.

6 Claims, 6 Drawing Sheets

U.S. PATENT DOCUMENTS

2005/0237670 A1   10/2005   Fujimoto et al.

FOREIGN PATENT DOCUMENTS

| JP | 01-245477 | 9/1989 |
|---|---|---|
| JP | 03-245381 | 10/1991 |
| JP | 03-292688 | 12/1991 |
| JP | 10-31873 | 2/1998 |
| JP | 2001-143422 | 5/2001 |
| JP | 2001-155458 | 6/2001 |
| JP | 2005-032393 | 2/2005 |

* cited by examiner

PROIR ART

MAGNETIC HEAD SUSPENSION WITH REDUCED MASS LOAD BEAM PORTION

BACKGROUND OF THE INVENTION

1. Field of the Invention

The present invention relates to a magnetic head suspension, which supports a magnetic head for reading/writing data from/to a storage medium such as a hard disk drive.

2. Related Art

For a magnetic head suspension, improvements in the resonance characteristic and the shock resistance are desired.

That is, in order to move a magnetic head at a high speed in a seeking direction toward a target track in a storage medium such as a hard disk drive, it is required to increase the resonance frequency of the magnetic head suspension.

Further, in a case that a shock is applied when the magnetic head is located at a loading position (that is, when the magnetic head is in a floating state above the storage medium), in order to prevent the magnetic head from jumping in a Z direction (a direction orthogonal to a storage surface of the storage medium) and damaging the storage surface of the storage medium, it is required to improve the shock resistance.

However, improvements in the resonance characteristic and improvements in the shock resistance are contradictory, so there is no magnetic suspension in which both are improved in a good balance.

In other words, it is required to increase the rigidity of a magnetic head suspension in order to improve the resonance characteristic.

For example, there is a proposal to make a load beam portion have a lamination structure over or across the substantially whole area in a longitudinal direction so as to increase the rigidity of the load beam portion to thereby improve the resonance characteristic (see JP-A 10-31873 (1998), hereinafter referred to as a cited reference).

However, in the magnetic head suspension described in the cited reference, the mass of the load beam portion increases, whereby the shock resistance is deteriorated.

SUMMARY OF THE INVENTION

The present invention has been accomplished in view of such conventional art. An object of the present invention is to provide a magnetic head suspension in which the resonance characteristic and the shock resistance are improved at the same time.

To achieve the above object, there is provided a magnetic head suspension including a flexure portion which has a magnetic head mount area for supporting a magnetic head slider, a load bend portion which generates a load for pressing the magnetic head slider to a storage surface of a storage medium, a load beam portion which transmits the load to the magnetic head mount area; and a base portion which supports the load bend portion.

In the magnetic head suspension, the load beam portion includes a base end area which is continuously connected with the load bend portion, an intermediate area which extends from the base end area toward a tip end side, and a tip end area which extends from the intermediate area toward the tip end side and reaches the magnetic head mount area.

The base end area has first side edges tilted so as to gradually approach a central longitudinal axis line of the magnetic head suspension as the first side edges go toward the tip end side.

The intermediate area has second side edges continuously connected with the first side edges and configured so as to be substantially parallel with the central longitudinal axis line or to be tiled to gradually approach the central longitudinal axis line as the second side edges go toward the tip end side.

The first side edges have a larger tilt angle with respect to the central longitudinal axis line in comparison with the second side edges.

The load beam portion has reinforcement structures at positions same as inflection points, where the first side edges and the second side edges intersect each other, in a central longitudinal axial direction.

According to this configuration, the first side edges of the base end of the load beam portion are set to be tilted so as to gradually approach the central longitudinal axis line toward the tip end side, and to have a tilt angle larger than the second side edges in the intermediate area. This enables to reduce the mass of the load beam portion as much as possible, and to improve the shock resistance.

Further, the reinforcement structures are provided at positions same as the inflection points, where the first side edges and the second side edges cross each other, in the longitudinal direction. Therefore, it is possible to prevent the rigidity from being deteriorated due to the mass reduction to thereby keep the resonance characteristic.

Preferably, the tip end area has third side edges continuously connected with the second side edges and tilted so as to be gradually spaced apart from the central longitudinal axis line as the third side edges go toward the tip end side. The load beam portion has reinforcement structures at positions same as inflection points, where the second side edges and the third side edges intersect each other, in the central longitudinal axial direction.

In one embodiment, each of the reinforcement structures is a flange provided to corresponding side edges over the inflection point.

Preferably, the flange extends across a substantially whole area of the load beam portion in a longitudinal direction.

More preferably, the load beam portion may have an opening formed over the inflection points in the central longitudinal axial direction, and flanges are provided on side edges of the opening.

Instead of the opening with the flanges, the load beam portion may have a drawing structure formed over the inflection points in the central longitudinal axial direction.

In another embodiment, the load beam portion has an opening formed over the inflection points in the central longitudinal axial direction, and the reinforcement structures may be flanges provided on side edges of the opening.

In still another embodiment, the reinforcement structure may be a drawing structure formed over the inflection points in the central longitudinal axial direction.

Preferably, the drawing structure is formed along corresponding inflection points.

In the various embodiments, the load beam portion and the load bend portion are integrally formed of a single member.

Alternatively, the load beam portion and the load bend portion may be formed of different member.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENT

Hereinafter, a preferred embodiment of a magnetic head suspension according to the present invention will be described with reference to the accompanying drawings.

Figure 1:
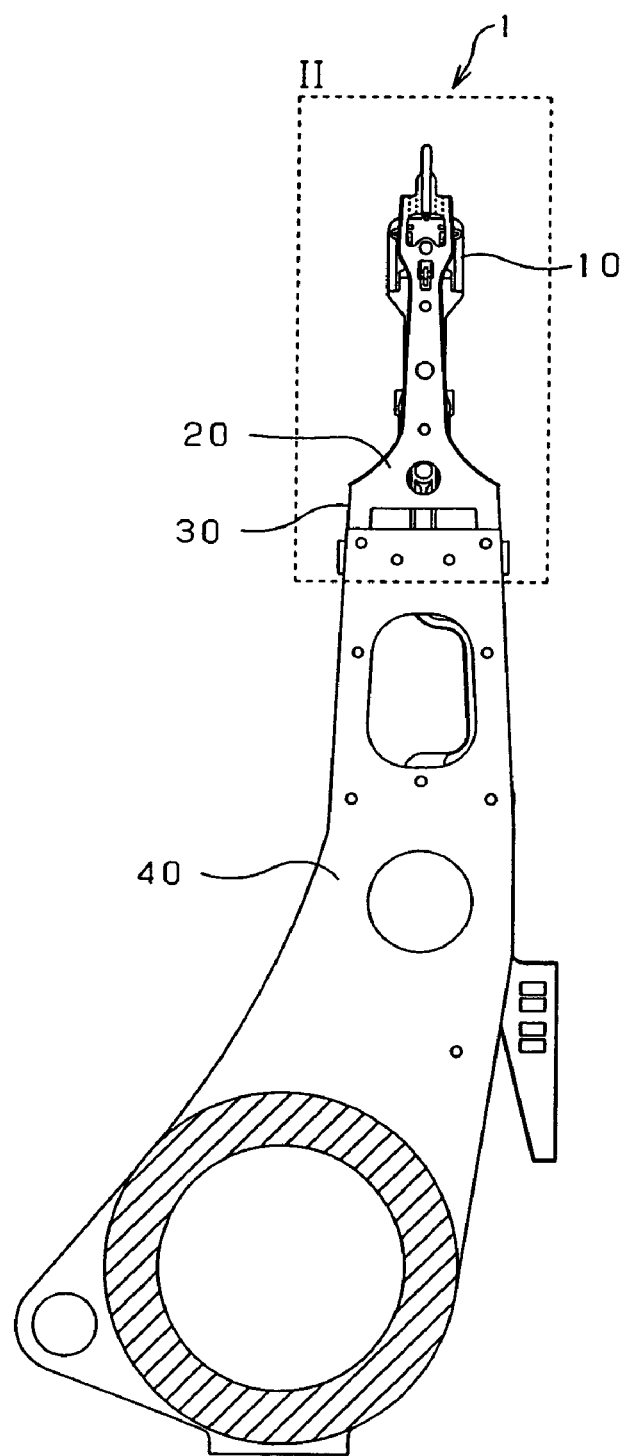
FIG. 1 is a top view showing a magnetic head suspension 1 of a preferred embodiment of this invention, viewed from a side opposite the storage surface of a storage medium such as a hard disk.

FIG. 1 is a top view showing a magnetic head suspension 1 of this embodiment, viewed from a side opposite the storage surface of a storage medium such as a hard disk.

Figure 2:
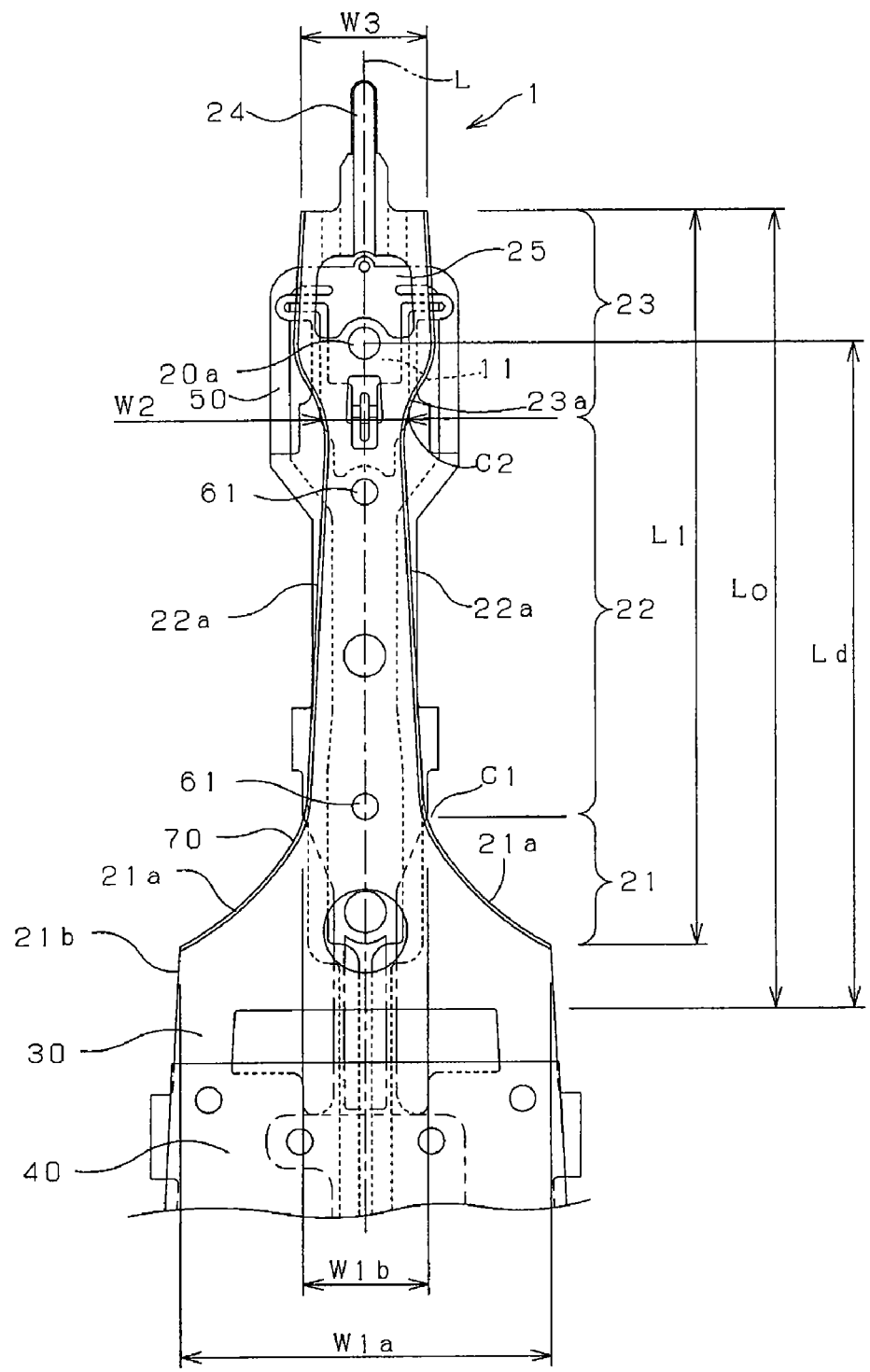
FIG. 2 is an enlarged view showing a part II in FIG. 1.

Further, FIG. 2 is an enlarged view showing a part II in FIG. 1.

As shown in FIGS. 1 and 2, the magnetic head suspension 1 according to this embodiment includes a flexure portion 10 which has a magnetic head mount area 11 for supporting a magnetic head slider (not shown), a load bend portion 30 which generates a load for pressing the magnetic head slider to the storage surface of a storage medium, a load beam portion 20 which transmits the load generated by the load bend portion 30 to the flexure portion 10, and a base portion 40 which supports the load bend portion 30.

The flexure portion 10 is made of, for example, a stainless steel plate material having a thickness of 10 μm to 30 μm.

The flexure portion 10 is so formed that the magnetic head mount area is supported in a cantilever state.

In this embodiment, the flexure portion 10 is formed of a member different from a member constituting the load beam portion 20. The flexure portion 10 is bonded to the load beam portion 20 by a weld 61 at optional positions within the overlapped area with the load beam portion 20.

Note that in this embodiment, a wiring structure 50 for electrically connecting the magnetic head slider with an external member is laminated integrally on the flexure portion 10.

The load bend portion 30 functions as a blade spring which presses the magnetic head slider to the storage surface against the pressure of an air membrane generated between the magnetic head slider and the storage surface with the rotation of a magnetic medium such as a magnetic disk, to thereby generate a magnetic head pressing load for securing a certain floating amount of the magnetic head slider.

As shown in FIGS. 1 and 2, in this embodiment, the load bend portion 30 is formed of a member constituting the load beam portion 20.

That is, in this embodiment, the load beam portion 20 and the load bend portion 30 are integrally formed of a single member.

The load bend portion 30 is made of, for example, a stainless steel material having a thickness of 25 μm to 50 μm.

The base portion 40 is so configured as to support an assembly including the flexure portion 10, the load beam portion 20 and the load bend portion 30 connected to each other, and to enable to transmit the drive force from an actuator to the assembly.

In this embodiment, the base portion 40 is an arm attached to a bearing of a voice coil motor. The arm is made of, for example, a stainless steel material having a thickness of 0.10 mm to 0.50 mm.

Note that the base portion 40 may be a mount attached to an E block by caulking, instead of the arm.

The load beam portion 20 transmits the magnetic head pressing load generated by the load bend portion 30 to the flexure portion 10, and moves the magnetic head slider 100 in a seeking direction to position it on a target track.

In this embodiment, the load beam portion 20 improves both of the resonance characteristic and the shock resistance by being provided with the following configuration.

That is, the load beam portion 20 includes a base end area 21 which is continuously connected with the load bend portion 30, an intermediate area 22 which extends from the base end area 21 toward the tip end side, and a tip end area 23 which extends from the intermediate area 22 toward the tip end side and reaches the magnetic head mount area 11.

Note that the reference numeral 24 in the figure denotes a lift tab which is continuously connected with the further tip end side of the tip end area.

As shown in FIG. 2, the base end area 21 has side edges 21a (hereinafter referred to as first side edges) tilted so as to gradually approach a central longitudinal axis line L of the magnetic head suspension 1 as the first side edges 21a go toward the tip end side in a plan view.

In this embodiment, the base and area 21 also has base end side edges 21b extending in substantially parallel with the central longitudinal axis line L between the first side edges 21a and the load bend portion 30.

As shown in FIG. 2, the intermediate area 22 has side edges 22a (hereinafter referred to as second side edges) which are continuously connected with the first side edges 21a and configured so as to be in substantially parallel with the central longitudinal axis line L or to be tilted to gradually approach the central longitudinal axis line L as the second side edges 22a go toward the tip end side in a plan view.

In the load beam portion 20, the tilt angle of the first side edge 21a with respect to the central longitudinal axis line L is set to be larger than the tilt angle of the second side edge 22a with respect to the central longitudinal axis line L, to thereby reduce the mass of the load beam portion 20.

Figure 3:
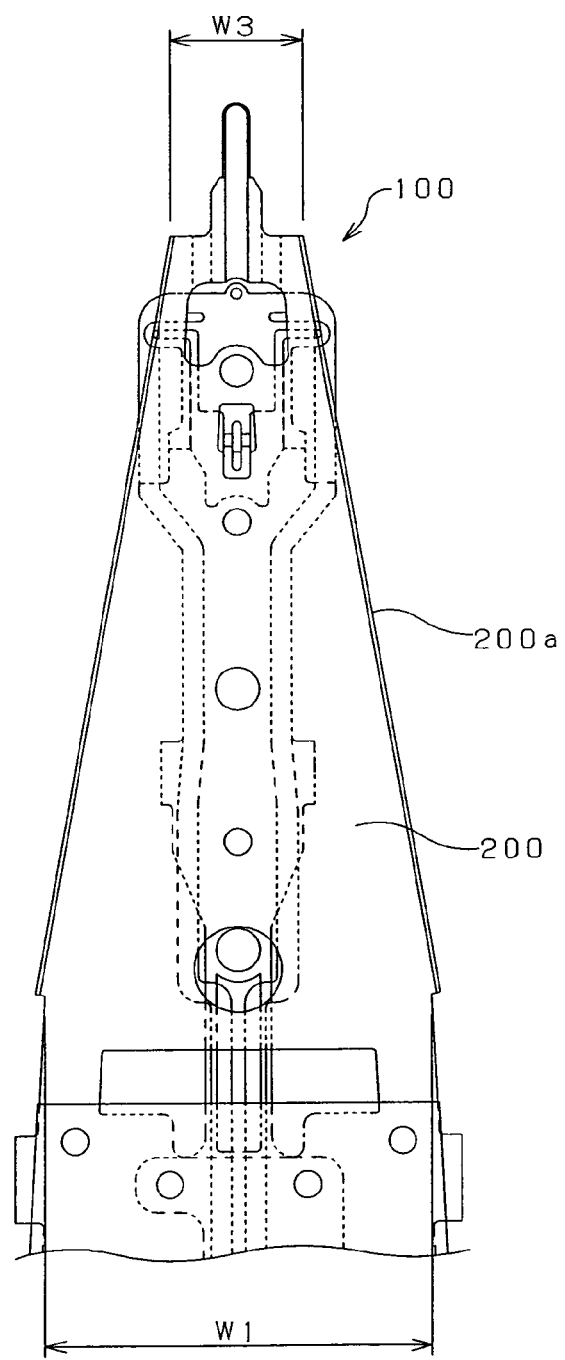
FIG. 3 is a top view showing a conventional magnetic head suspension

FIG. 3 is a top view showing a conventional magnetic head suspension 100 which includes a load beam portion 200 having side edges 200a tilted at a certain angle so as to gradually approach the central longitudinal axis line as the side edges 200a go toward the tip end side.

Figure 4:
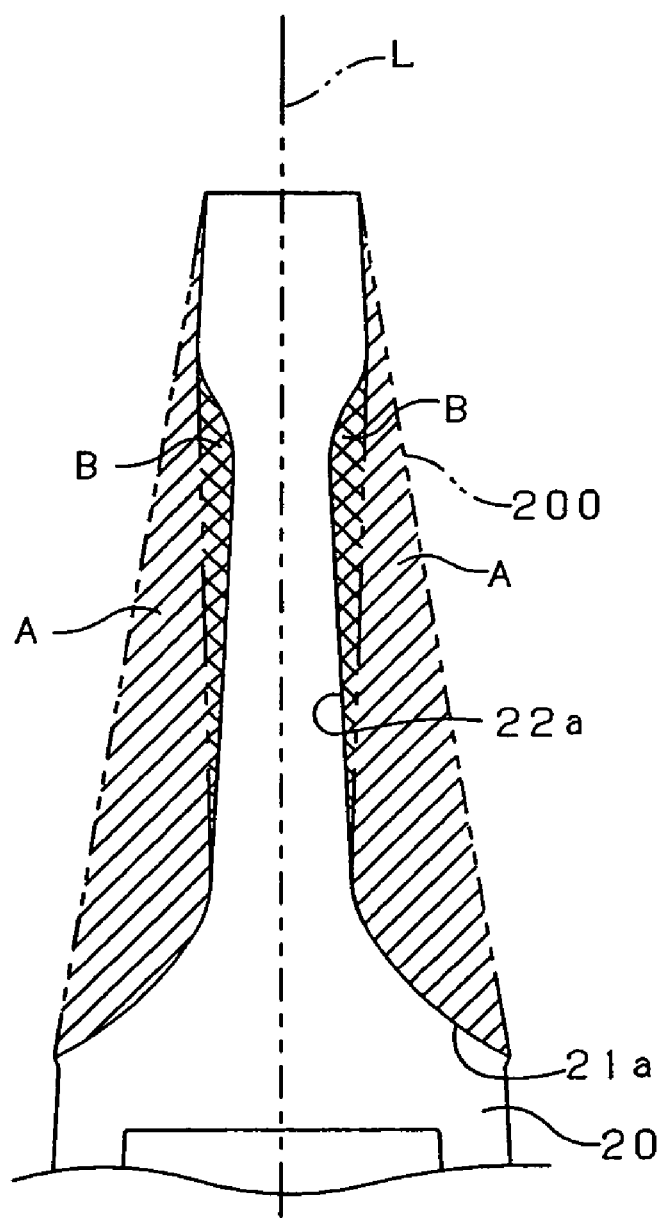
FIG. 4 is a schematic view in which the load beam portion of the magnetic head suspension shown in FIGS. 1 and 2, and the load beam portion of the conventional magnetic head suspension shown in FIG. 3.

Further, FIG. 4 is a schematic view in which the load beam portion 20 of the magnetic head suspension 1 according to this embodiment and the load beam portion 200 of the conventional magnetic head suspension 100 are superposed.

As described above, in the load beam portion 20, the tilt angle of the first side edge 21a with respect to the central longitudinal axis line L is set to be larger than the tilt angle of the second side edge 22a with respect to the central longitudinal axis line L.

Therefore, in the load beam portion 20, it is possible to reduce the mass corresponding to portions A shown in FIG. 4, in comparison with the load beam portion 200 of the conventional magnetic head suspension 100. This improves the shock resistance.

Further, as shown in FIG. 2, the load beam portion 20 is so configured as to have the reinforcement structures at the positions same as inflection points C1, where the first side edges 21a and the second side edges 22a cross each other, in the central longitudinal axial direction. With this structure, deterioration in the rigidity caused by removing the portions A is complemented.

In other words, by considering the fact that the rigidity becomes the weakest at the inflection points C1 where the tilt angle changes, the load beam portion 20 is configured so as to have the reinforcement structures at least at the positions same as the inflection points C1 in the central longitudinal axial direction.

Specifically, the load beam portion 20 has flanges 70, as the reinforcement structures, each of which is provided on the first side edge 21a and the second side edge 22a over the inflection point C1 in the central longitudinal axial direction.

It is more preferable that the flange 70 is provided over or across the substantially whole area of the load beam portion 20 in the longitudinal direction. This enables to further improve the rigidity of the load beam portion 20.

In this way, since the first side edge 21a is set to be more tilted with respect to the central longitudinal axis line L than the second side edge 22a in this embodiment, the mass of the load beam portion 20 is reduced to thereby improve the shock resistance (limit acceleration) of the load beam portion 20. Further, the reinforcement structures (flanges 70 in the embodiment shown in the figure) are provided at the positions same as the inflection points C1, where the first side edges 21a and the second side edges 22a intersect each other, in the central longitudinal axial direction to thereby prevent the rigidity of the load beam portion 20 from being deteriorated and to improve the resonance characteristic.

Further, in the load beam portion 20, the tip end area 23 is set to have side edges 23a (hereinafter referred to as third side edges) which are continuously connected with the second side edges 22a and tilted so as to be gradually spaced apart from the central longitudinal axis line L as the third side edges 23a go toward the tip end side. Thereby, it is possible to reduce the mass of the load beam portion 20 as much as possible, and also the load beam portion 20 can be applied to a magnetic head suspension of a GBB style.

That is, in the GBB style in which the wiring structure 50 is supported by the flexure portion 10 and a terminal of the magnetic head are electrically connected by a ball bonding with gold, it is required to form an opening 25 for inserting a solder jig at an area corresponding to the terminal position of the magnetic head (hereinafter referred to as a terminal corresponding area) in the load beam portion 20 (see FIG. 2).

In other words, in the load beam portion 20 applied to the GBB style, the width of the tip end area is defined by the opening 25 for inserting a solder jig.

In order to make the load beam portion 20 applicable to the GBB style and also to reduce the mass as much as possible, the load beam portion 20 of this embodiment is so configured that the third side edges 23a continuously connected with the second side edges 22a are tilted so as to be gradually spaced apart from the central longitudinal axis line L as the third side edges 23a go toward the tip end side.

With such third side edges 23a, it is possible to reduce the mass corresponding to portions B shown in FIG. 4. This further improves the shock resistance.

Further, in order to compensate the weakness in rigidity at inflection points C2 where the second side edges 22a and the third side edges 23a intersect each other, the load beam portion 20 has reinforcement structures (flanges 70 in the embodiment shown in the figure) at the positions same as the inflection points C2 in the central longitudinal axial direction.

Accordingly, it is possible to improve the shock resistance and also to prevent deterioration in rigidity so as to improve the resonance characteristic.

Now, the relationship between the shock resistance and the resonance characteristic at a dimple 20a of the magnetic head suspension 1 according to this embodiment will be described on the basis of a finite element method analysis in the following conditions (hereinafter, referred to as an example).

ANALYSIS CONDITIONS OF EXAMPLE

Material of load beam portion 20: SUS304 (Young's modules: 19700 kgf/mm$^2$, density: 8.03×10$^{-6}$ kgf/mm$^3$).

Thickness of load beam portion 20: t=0.038 mm

Base end width between first side edges 21a: W1a=3.547 mm

Tip end width between first side edges 21a: W1b=1.179 mm

Tip end width between second side edges 22a: W2=0.834 mm

Tip end width between third side edges 23a: W3=1.211 mm

Length from base end of base end area 21 to tip end of tip end area 23: Lo=7.619 mm.

Length from base end of first side edge 21a to tip end of third side edge 23a: L1=7.111 mm Distance from base end of load beam portion 20 to dimple 20a: Ld=6.365 mm Height of flange formed over or across whole area from first side edge 21a to third side edge 23a as reinforcement structure: h=0.16 mm In the magnetic head suspension 1 of such dimensions, an attachment hole of the base portion 40 was made to be in a completely constrained state. Further, in order to simulate the rigidity of an air bearing acted between the magnetic head slider and the storage surface of the storage medium, there was used a spring element in which its base end was coupled to the magnetic head slider and its the tip end was fixed.

Then, to the example under such constraint conditions, sine half waves with a maximum value of 1 G and wavelengths (2 msec, 1 msec and 0.5 msec) were inputted to the constrained position to thereby obtain a jumping level of the center part of the magnetic head slider by the finite analysis.

The analysis results are shown in Table 1.

Further, resonant frequencies in a primary mode of torsion and a secondary mode of torsion of the example were obtained by the finite analysis.

The analysis results are also shown in Table 1.

TABLE 1

|  | Shock resistance | | | Resonance characteristic | |
| --- | --- | --- | --- | --- | --- |
|  | Shock half wave at 2.0 ms | Shock half wave at 1.0 ms | Shock half wave at 0.5 ms | Primary mode of torsion | Secondary mode of torsion |
| Example | 279 G/gf | 233 G/gf | 262 G/gf | 6.47 kHz | 14.3 kHz |
| Comparative example | 197 G/gf | 157 G/gf | 168 G/gf | 4.33 kHz | 11.8 kHz |

For a comparison, a similar analysis was carried out for the conventional magnetic head suspension 100 shown in FIG. 3 (hereinafter referred to as a comparative example).

Note that in the comparative example, members other than the load beam portion 200 had the same configurations as those of the embodiment.

As the load beam portion 200, there was used one having side edges 200a in which portions corresponding to the first side edges 21a to the third side edges 23a are tilted uniformly. Further, the base end width w1 and the tip end width w3 between the side edges 200a were same as the base end width W1a between the first side edges 21a and the tip end width W3 between the third side edges 23a. Further, flanges having a height of 0.16 mm were provided to the side edges 200a. The thickness of the load beam portion 200 was 0.038 mm, same as that of the load beam portion 20.

The analysis results in the comparative example are also shown in Table 1.

As obvious from Table 1, it was confirmed that the shock resistance in the example was improved about 1.5 times as compared with the comparative example.

Further, the resonance characteristic in the example was also improved as compared with the comparative example in both of the primary mode of torsion and the secondary mode of torsion.

As described above, in the magnetic head suspension 1 according to this embodiment, the first side edges 21a in the based end area 21 of the load beam portion 20 are more tilted in a direction approaching the central longitudinal axis line L, as compared with the second side edges 22a in the intermediate area 22. Thereby, it is possible to reduce the mass of the load beam portion 20, in particular, the mass of the areas spaced apart from the load bend portion 30 toward the tip end side, which enables to improve the shock resistance.

Further, the reinforcement structures (the flanges 70 in the embodiment shown in the figure) are provided on the positions same as the inflection points C1, where the first side edges 21a and the second side edges 22a intersect each other, in the central longitudinal axial direction. Thereby, it is possible to effectively reinforce the portions with the weakest rigidity, which enables to improve the resonance characteristic.

Note that although the flanges 70 are provided as the reinforcement structures in this embodiment, the present invention is not limited to this embodiment of course.

Figure 5:
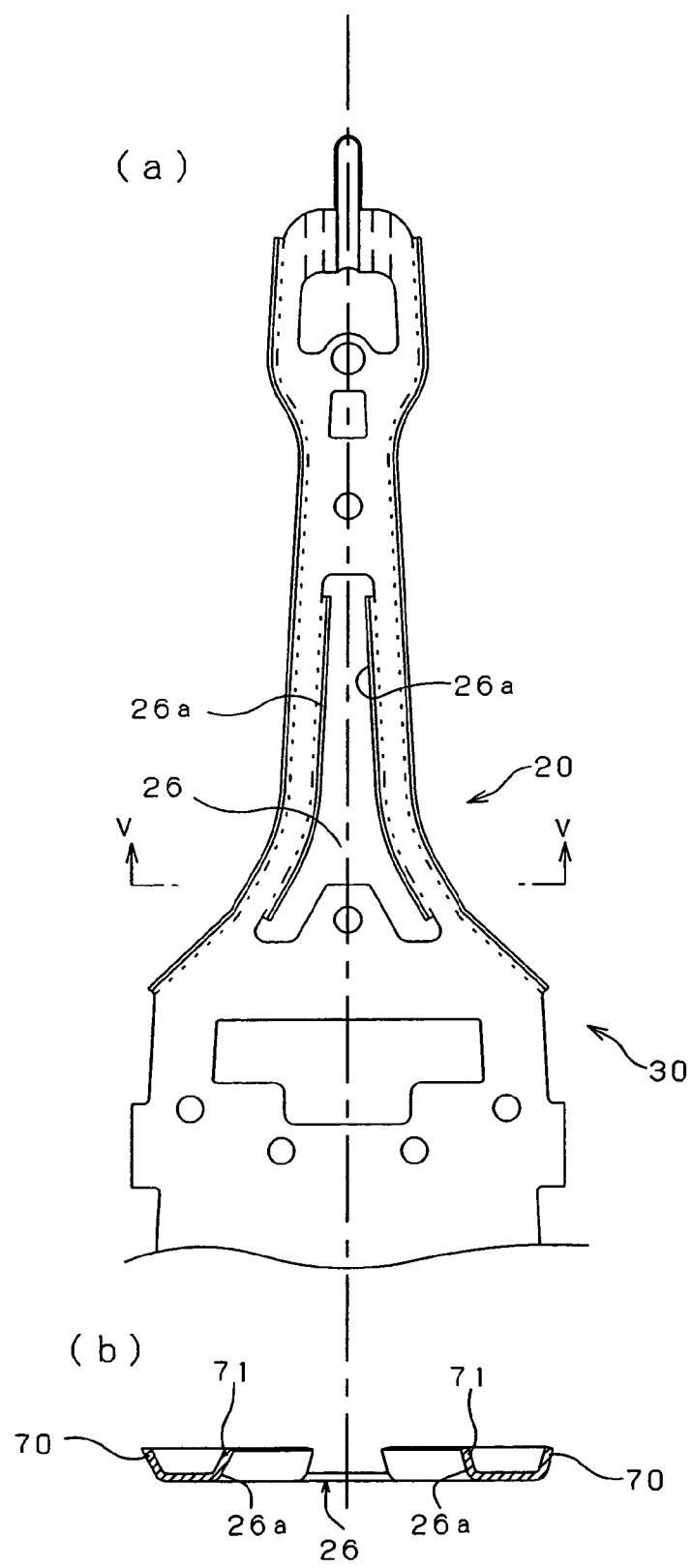
FIG. 5(a) is a top view showing a magnetic head suspension 1 of another embodiment of this invention.
FIG. 5(b) is a cross sectional view taken along line V-V in FIG. 5(a).
Figure 6:
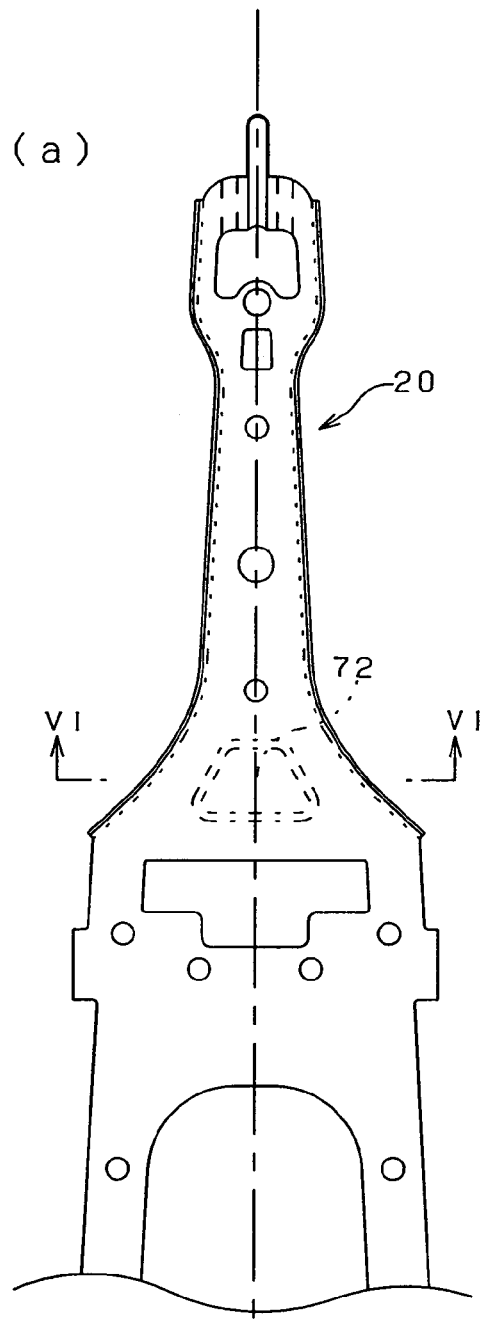
FIG. 6(a) is a top view showing a magnetic head suspension 1 of still another embodiment of this invention.
FIG. 6(b) is a cross sectional view taken along line VI-VI in FIG. 6(a).
Figure 6:
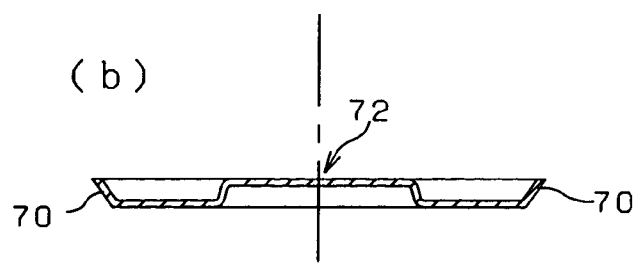

Instead of or in addition to the flanges 70, flanges 71 may be provided on side edges 26a of a hollow opening 26 formed in the load beam portion 20 (see FIG. 5). Alternatively, a drawing structure 72 may be provided to the load beam portion 20 (see FIG. 6), for example.

Further, although the load beam portion 20 and the load bend portion 30 are integrally formed of a single member as described above in this embodiment, they may be formed of different members.

By forming the load beam portion 20 and the load bend portion 30 of different members as described above, it is possible to set the respective thickness freely.

This specification is by no means intended to restrict the present invention to the preferred embodiment set forth therein. Various modifications to the magnetic head suspension as described herein may be made by those skilled in the art without departing from the spirit and scope of the present invention as defined in the appended claims.

What is claimed is:

1. A magnetic head suspension comprising:
a flexure portion which has a magnetic head mount area for supporting a magnetic head slider;
a load bend portion which generates a load for pressing said magnetic head slider to a storage surface of a storage medium;
a load beam portion which transmits said load to said magnetic head mount area; and
a base portion which supports said load bend portion, wherein
said load beam portion includes: a base end area which is continuously connected with said load bend portion, an intermediate area which extends from the base end area toward a tip end side, and a tip end area which extends from the intermediate area toward the tip end side and reaches said magnetic head mount area, said tip end area being formed with an opening through which a jig is inserted for electrically connecting a wiring structure supported by the flexure portion to a terminal of said magnetic head slider by a gold ball bonding,
said base end area has a pair of first side edges tilted so as to gradually approach a central longitudinal axis line of the magnetic bead suspension as said pair of first side edges go toward the tip end side,
said intermediate area has a pair of second side edges continuously connected with said pair of first side edges, respectively and configured so as to be substantially parallel with said central longitudinal axis line or to be tilted to gradually approach the central longitudinal axis line as said pair of second side edges go toward the tip end side,
said tip end area has a pair of third side edges extending toward the tip end side from said pair of second side edges, respectively,
said pair of first side edges have a larger tilt angle with respect to said central longitudinal axis line in comparison with said pair of second side edges,
said pair of third side edges are gradually spaced apart from the central longitudinal axis line as said pair of third side edges go toward the tip end side so as to be capable of enlarging a width of the opening through which the jig is inserted,
said load beam portion has reinforcement structures formed by a pair of flanges arranged at both sides of said load beam portion, the pair of flanges extending so as to be over a pair of first inflection points where said pair of first side edges respectively intersect with said pair of second side edges, in respect to a central longitudinal axial direction, and to be over a pair of second inflection points where said pair of second side edges respectively intersect with said pair of third side edges, in respect to the central longitudinal axial direction.

2. The magnetic head suspension of claim 1, wherein
said load beam portion and said load bend portion are integrally formed of a single member.

3. The magnetic head suspension of claim 1, wherein
said load beam portion is formed by one member, and said load bend portion is formed by another member and welded to said load beam portion.

4. The magnetic head suspension of claim 1, wherein
said pair of flange extends across a substantially whole area of said load beam portion in a longitudinal direction.

5. The magnetic head suspension of claim 1, wherein
said load beam portion has an opening that is over said pair of first inflection points in respect to the central longitudinal axial direction, said opening has a pair of first opening edges respectively parallel to said pair of first side edges and a pair of second opening edges respectively parallel to said pair of second side edges, and said load beam portion has another reinforcement structures formed by a pair of another flanges, the pair of another flanges arranged at said pair of first opening edges and said pair of second opening edges so as to be over a pair of inflection points between said pair of first opening edges and said pair of second opening edges in respect to the central longitudinal axial direction.

6. The magnetic head suspension of claim 1, wherein
said load beam portion has a drawing structure that is formed so as to be over said pair of first inflection points in respect to the central longitudinal axial direction.

\* \* \* \* \*

UNITED STATES PATENT AND TRADEMARK OFFICE
CERTIFICATE OF CORRECTION

| | |
|---|---|
| PATENT NO. | : 7,365,944 B2 |
| APPLICATION NO. | : 11/073709 |
| DATED | : April 29, 2008 |
| INVENTOR(S) | : Fujimoto et al. |

It is certified that error appears in the above-identified patent and that said Letters Patent is hereby corrected as shown below:

In claim 5, col. 10, lines 3-5, "another", each occurrence, should be --other--.

Signed and Sealed this

Twenty-second Day of July, 2008

JON W. DUDAS
*Director of the United States Patent and Trademark Office*